United States Patent
Kim et al.

(10) Patent No.: US 12,376,582 B2
(45) Date of Patent: Aug. 5, 2025

(54) MOSQUITO REPELLENT SYSTEM AND METHOD FOR OPERATING THE SAME

(71) Applicants: Hyundai Motor Company, Seoul (KR); Kia Corporation, Seoul (KR)

(72) Inventors: Ki Chang Kim, Gyeonggi-do (KR); Dong Chul Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 96 days.

(21) Appl. No.: 18/388,085

(22) Filed: Nov. 8, 2023

(65) Prior Publication Data
US 2024/0397934 A1 Dec. 5, 2024

(30) Foreign Application Priority Data
Jun. 2, 2023 (KR) .................. 10-2023-0071324

(51) Int. Cl.
*A01M 29/18* (2011.01)
*B60R 99/00* (2009.01)

(52) U.S. Cl.
CPC ............. *A01M 29/18* (2013.01); *B60R 99/00* (2013.01); *A01M 2200/012* (2013.01)

(58) Field of Classification Search
CPC . A01M 29/18; A01M 2200/012; B60R 99/00; B60R 13/02; B60R 16/037; B60R 2013/0287; B60W 40/08; B60W 2040/0881; B60W 2420/403; B60W 2540/049; B60W 2540/223; B60W 2540/227
See application file for complete search history.

(56) References Cited

U.S. PATENT DOCUMENTS

| | | | |
|---|---|---|---|
| 2022/0248659 A1* | 8/2022 | Salter | A01M 29/18 |
| 2023/0380408 A1 | 11/2023 | Kim et al. | |
| 2023/0380409 A1 | 11/2023 | Kim et al. | |

FOREIGN PATENT DOCUMENTS

| | | | | |
|---|---|---|---|---|
| CN | 110896944 A | * | 3/2020 | ............ A01M 29/18 |
| CN | 116616274 A | * | 8/2023 | |
| CN | 117103935 A | * | 11/2023 | |
| CN | 117518888 A | * | 2/2024 | |
| IN | 202211065179 A | * | 5/2024 | |
| KR | 10-2022-0013805 A | | 2/2022 | |
| KR | 10-2023-0163780 A | | 12/2023 | |
| KR | 10-2023-0166341 A | | 12/2023 | |
| WO | WO-2023219358 A1 | * | 11/2023 | |

* cited by examiner

Primary Examiner — An T Nguyen
(74) Attorney, Agent, or Firm — Fox Rothschild LLP

(57) ABSTRACT

A mosquito repellent system and a method for operating the same are provided. The mosquito repellent system includes a passenger detection device that detects a passenger in a vehicle, a mosquito recognition device that recognizes a mosquito, a first ultrasonic device and a second ultrasonic device that generate and radiate an ultrasonic wave, and a control device configured to obtain information about the passenger using the passenger detection device, determine whether there is a mosquito in the vehicle using the mosquito recognition device, and control at least one of the first ultrasonic device or the second ultrasonic device, or a combination thereof to radiate the ultrasonic wave based on the information about the passenger in response determining that there is the mosquito in the vehicle.

20 Claims, 16 Drawing Sheets

MOSQUITO REPELLENT SYSTEM AND METHOD FOR OPERATING THE SAME

CROSS-REFERENCE TO RELATED APPLICATION

This application claims under 35 U.S.C. § 119(a) the benefit of Korean Patent Application No. 10-2023-0071324, filed in the Korean Intellectual Property Office on Jun. 2, 2023, the entire contents of which are incorporated herein by reference.

BACKGROUND

Technical Field

The present disclosure relates to a mosquito repellent system for repelling mosquitoes in a vehicle using an ultrasonic wave and a method for operating the same.

Description of the Related Art

Mosquitoes are sanitary pests, which transmit diseases such as malaria, Japanese encephalitis and dengue. Thus, various technologies for repelling mosquitoes have been developed. For example, mosquito repellent devices such as an electronic mosquito repellent incense device and an ultrasonic mosquito repellent system have been developed. Furthermore, research for applying a mosquito repellent system using an ultrasonic wave to a vehicle has been conducted.

SUMMARY

An aspect of the present disclosure provides a mosquito repellent system for controlling an ultrasonic radiation angle based on a sitting posture of a passenger in a vehicle and a method for operating the same.

Another aspect of the present disclosure provides a mosquito repellent system for interworking with a door glass to control the door glass based on a sitting posture of a passenger in the state where the vehicle is stopped and a method for operating the same.

Another aspect of the present disclosure provides a mosquito repellent system for controlling an ultrasonic radiation pattern based on a position of a passenger in the vehicle and the sitting posture of the passenger and separately controlling ultrasonic vibrators and a method for operating the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a mosquito repellent system may include a passenger detection device that detects a passenger in a vehicle, a mosquito recognition device that recognizes a mosquito, a first ultrasonic device and a second ultrasonic device that generate and radiate an ultrasonic wave, and a control device configured to obtain information about the passenger using the passenger detection device, determine whether there is a mosquito in the vehicle using the mosquito recognition device, and control at least one of the first ultrasonic device or the second ultrasonic device, or a combination thereof to radiate the ultrasonic wave based on the information about the passenger in response determining that there is the mosquito in the vehicle. The control device may be connected with the passenger detection device, the mosquito recognition device, the first ultrasonic device, and the second ultrasonic device.

The information about the passenger may include at least one of a seating position of the passenger, a sitting posture of the passenger, or the number of passengers, or any combination thereof.

The control device may operate the first ultrasonic device if an angle of a seat back of the vehicle is less than or equal to a predetermined first criterion and that a degree to which a seat position of the vehicle is adjusted in a longitudinal direction of the vehicle is less than or equal to a predetermined second criterion.

The control device may operate the first ultrasonic device and may operate some of ultrasonic vibrators of the second ultrasonic device if a passenger rides in only a first row seat of the vehicle.

The control device may operate the first ultrasonic device and the second ultrasonic device if passengers ride in a first row seat and a second row seat of the vehicle.

The control device may control the first ultrasonic device and the second ultrasonic device to radiate an ultrasonic wave to a door glass if passengers ride in a third row seat or more of the vehicle. A mosquito repellent sound field may be formed as the ultrasonic wave multiply reflected from the door glass.

The control device may transmit a primary ultrasonic wave in response determining that there is the mosquito in the vehicle, may determine a position of the mosquito in the vehicle, may determine a first window based on the position of the mosquito, may determine whether the position of the mosquito is within a predetermined threshold distance from the first window, may open the first window in a state where the vehicle is stopped, when it is determined that the position of the mosquito is within the predetermined threshold distance from the first window, and may control at least one of the first ultrasonic device or the second ultrasonic device, or a combination thereof to radiate the ultrasonic wave at maximum power.

The control device may transmit a secondary ultrasonic wave for guiding the mosquito to the first window in response determining that the position of the mosquito is not within the predetermined threshold distance from the first window.

The control device may select a window closest to a position of the mosquito in response determining that the vehicle is in a stop state and may transmit the ultrasonic wave and may open the selected window.

The control device may operate the first ultrasonic device to radiate the ultrasonic wave to a first row seat in the vehicle in response determining that the vehicle is in a driving state, may determine whether there is a passenger in an ultrasonic radiation area of the second ultrasonic device with regard to at least one of an ultrasonic radiation pattern, a passenger sitting posture, or a seat position, or any combination thereof, may operate at least some of ultrasonic vibrators of the second ultrasonic device in response determining that there is the passenger sitting in the first row seat in the ultrasonic radiation area, may operate all the ultrasonic vibrators of the second ultrasonic device in response determining that there is the passenger sitting in a second row seat in the vehicle in the ultrasonic radiation area, and may turn off the second ultrasonic device if there is no passenger in the ultrasonic radiation area.

The passenger detection device may detect the passenger using at least one of a sitting sensor or a camera, or any combination thereof.

The mosquito recognition device may recognize the mosquito using at least one of a camera or an ultrasonic sensor, or any combination thereof.

The first ultrasonic device and the second ultrasonic device may be inserted into at least one of a roof trim in the vehicle, a door trim in the vehicle, a seat in the vehicle, a trunk trim in the vehicle, or a tailgate trim in the vehicle, or any combination thereof.

According to another aspect of the present disclosure, a method for operating a mosquito repellent system may include obtaining information about a passenger in a vehicle using a passenger detection device included in the mosquito repellent system, determining whether there is a mosquito in the vehicle using a mosquito recognition device included in the mosquito repellent system, and controlling at least one of a first ultrasonic device included in the mosquito repellent system or a second ultrasonic device included in the mosquito repellent system, or any combination thereof to radiate an ultrasonic wave based on the information about the passenger in response determining that there is the mosquito in the vehicle.

The information about the passenger may include at least one of a seating position of the passenger, a sitting posture of the passenger, or the number of passengers, or any combination thereof.

The controlling of the at least one of the first ultrasonic device or the second ultrasonic device, or a combination thereof to radiate the ultrasonic wave may include operating the first ultrasonic device if an angle of a seat back of the vehicle is less than or equal to a predetermined first criterion and when a degree to which a seat position of the vehicle is adjusted in a longitudinal direction of the vehicle is less than or equal to a predetermined second criterion.

The controlling of the at least one of the first ultrasonic device or the second ultrasonic device, or a combination thereof to radiate the ultrasonic wave may include operating the first ultrasonic device and operating some of ultrasonic vibrators of the second ultrasonic device if a passenger rides in only a first row seat of the vehicle.

The controlling of the at least one of the first ultrasonic device or the second ultrasonic device, or a combination thereof to radiate the ultrasonic wave may include operating the first ultrasonic device and the second ultrasonic device, when passengers ride in a first row seat and a second row seat of the vehicle.

The controlling of the at least one of the first ultrasonic device or the second ultrasonic device, or a combination thereof to radiate the ultrasonic wave may include controlling the first ultrasonic device and the second ultrasonic device to radiate the ultrasonic wave to a door glass if passengers ride in the third row seat or more of the vehicle. A mosquito repellent sound field is formed as the ultrasonic wave multiply reflected from the door glass.

The controlling of the at least one of the first ultrasonic device or the second ultrasonic device, or a combination thereof to radiate the ultrasonic wave may include transmitting a primary ultrasonic wave in response determining that there is the mosquito in the vehicle, determining a position of the mosquito in the vehicle, determining a first window based on the position of the mosquito, determining whether the position of the mosquito is within a predetermined threshold distance from the first window, opening the first window in a state where the vehicle is stopped, when it is determined that the position of the mosquito is within the predetermined threshold distance from the first window, and controlling at least one of the first ultrasonic device or the second ultrasonic device, or a combination thereof to radiate the ultrasonic wave at maximum power.

The controlling of the at least one of the first ultrasonic device or the second ultrasonic device, or a combination thereof to radiate the ultrasonic wave may further include transmitting a secondary ultrasonic wave for guiding the mosquito to the first window in response determining that the position of the mosquito is not within the predetermined threshold distance from the first window.

The controlling of the at least one of the first ultrasonic device or the second ultrasonic device, or a combination thereof to radiate the ultrasonic wave may include selecting a window closest to a position of the mosquito in response determining that the vehicle is in a stop state, and transmitting the ultrasonic wave and opening the selected window.

The controlling of the at least one of the first ultrasonic device or the second ultrasonic device, or a combination thereof to radiate the ultrasonic wave may include operating the first ultrasonic device to radiate the ultrasonic wave to a first row seat in the vehicle in response determining that the vehicle is in a driving state, determining whether there is a passenger in an ultrasonic radiation area of the second ultrasonic device with regard to at least one of an ultrasonic radiation pattern, a passenger sitting posture, or a seat position, or any combination thereof, operating at least some of ultrasonic vibrators of the second ultrasonic device in response determining that there is the passenger sitting in the first row seat in the ultrasonic radiation area, operating all the ultrasonic vibrators of the second ultrasonic device in response determining that there is the passenger sitting in a second row seat in the vehicle in the ultrasonic radiation area, and turning off the second ultrasonic device, when there is no passenger in the ultrasonic radiation area.

As discussed, the method and system suitably include use of a controller or processor.

In another embodiment, vehicles are provided that comprise an apparatus as disclosed herein.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
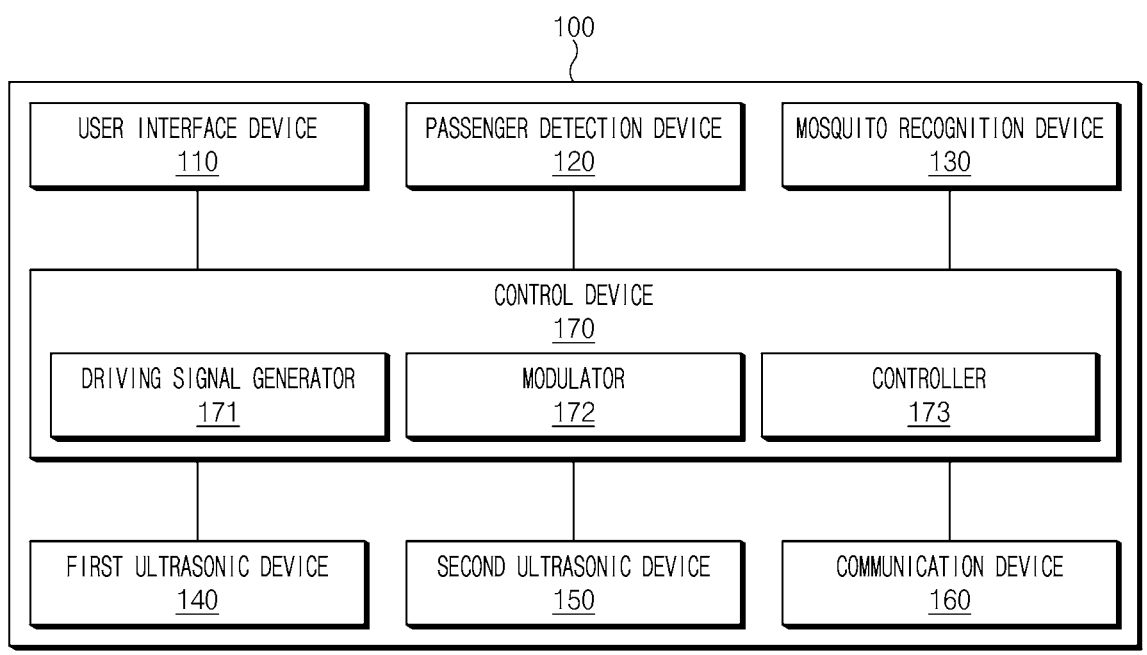
FIG. 1 is a block diagram illustrating a configuration of a mosquito repellent system according to exemplary embodiments of the present disclosure.

Hereinafter, some exemplary embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of this disclosure and the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 900, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Figure 2A:
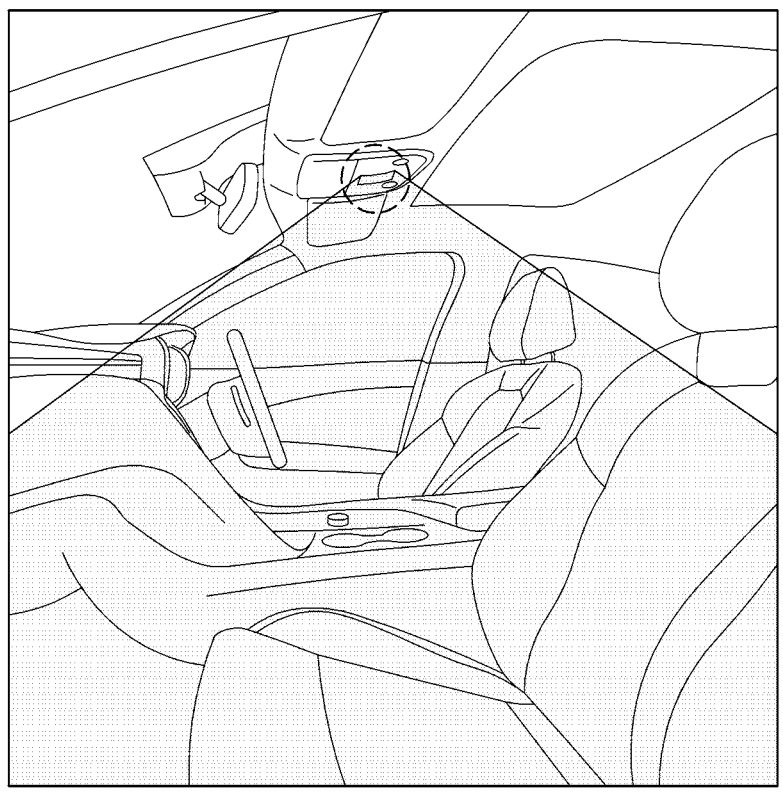
FIG. 2A and FIG. 2B are drawings illustrating examples of mounting an ultrasonic device according to exemplary embodiments of the present disclosure.
Figure 2B:
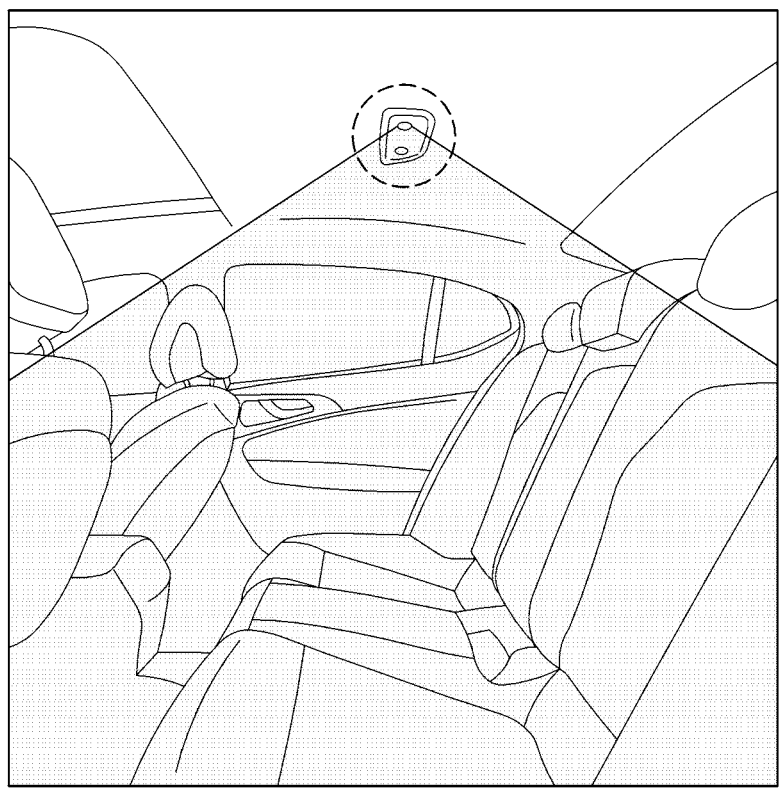
Figure 3A:
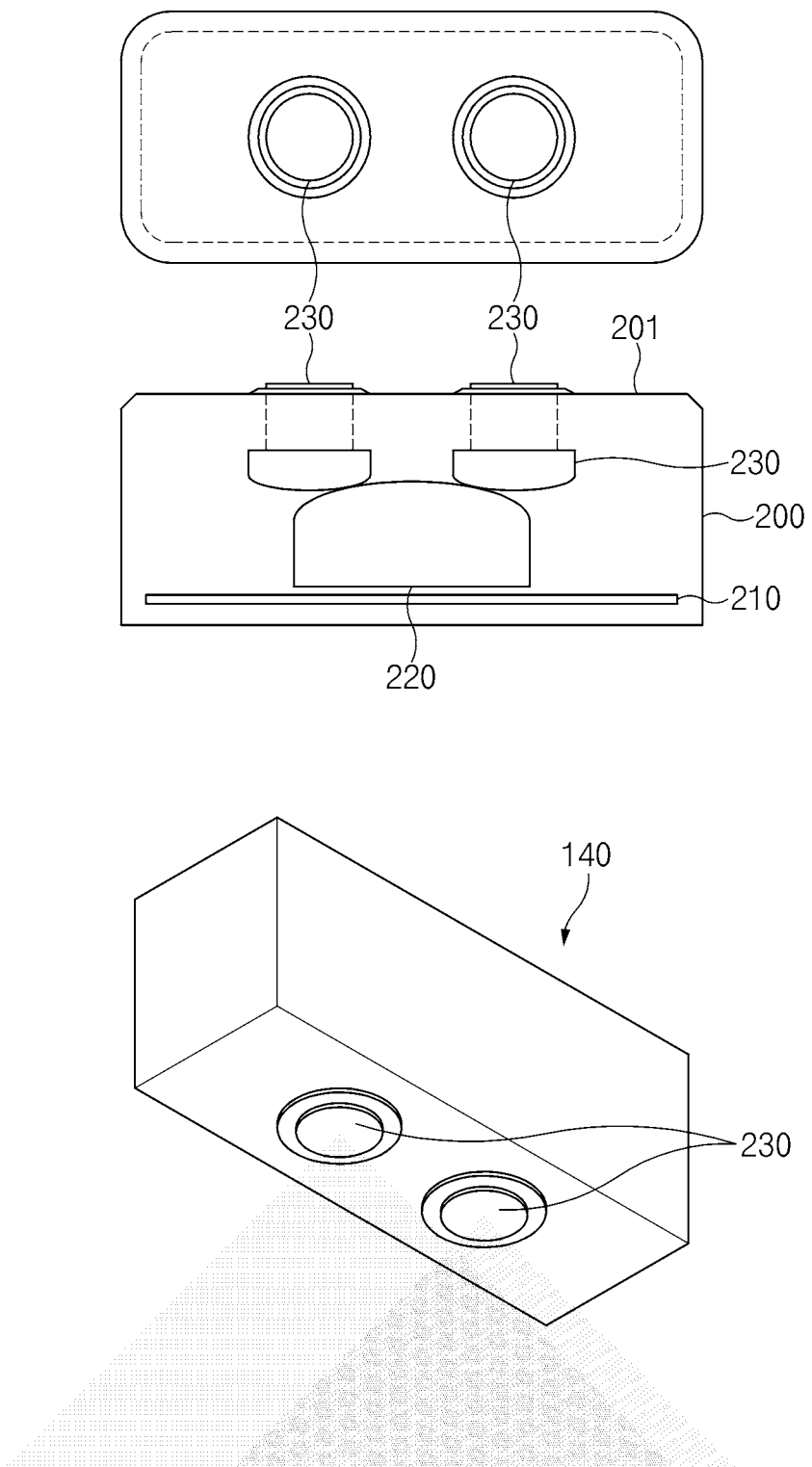
FIGS. 3A and 3B are drawings illustrating a structure of an ultrasonic device according to exemplary embodiments of the present disclosure.
Figure 3B:
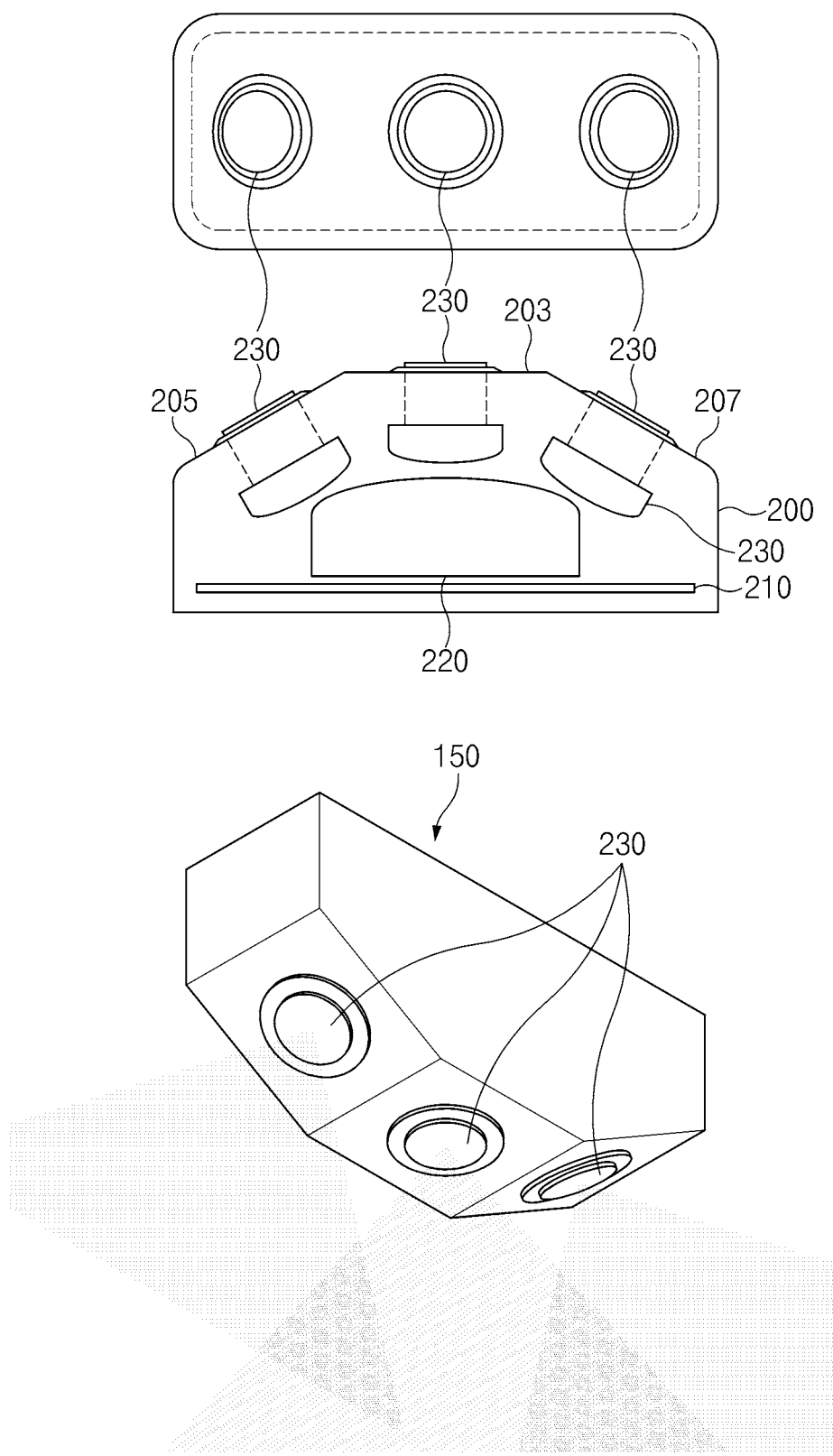
Figure 4A:
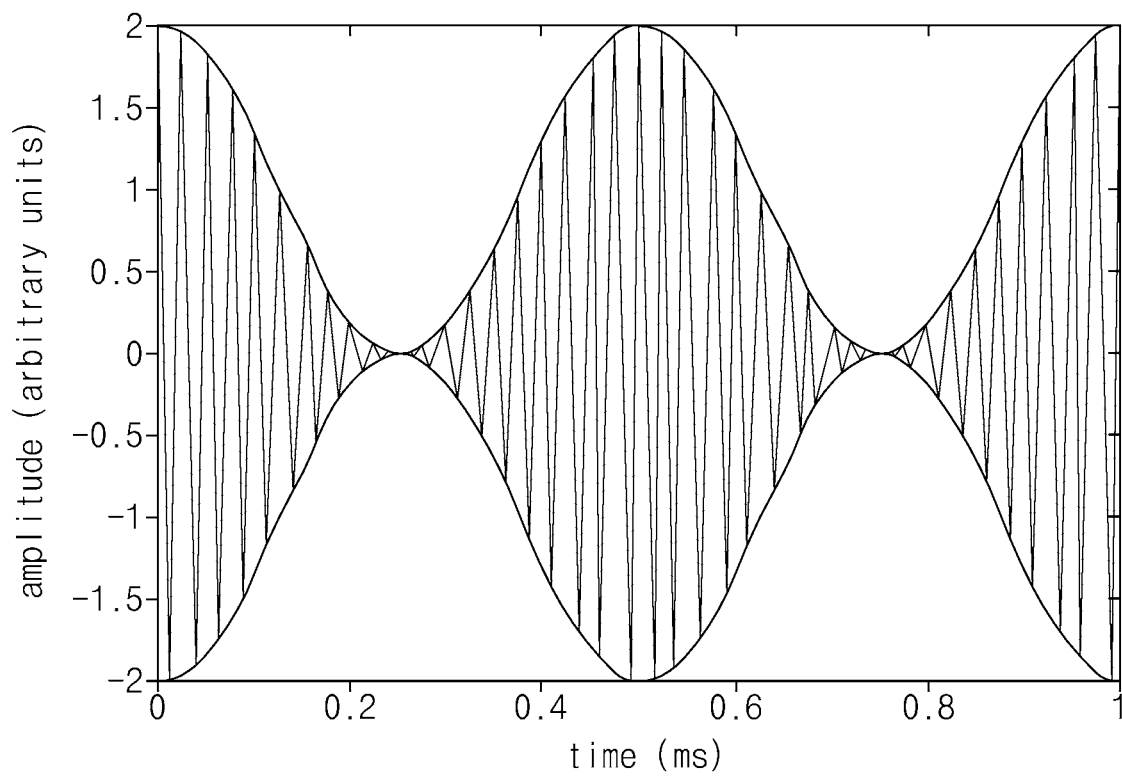
FIG. 4A is a drawing illustrating a single waveform according to exemplary embodiments of the present disclosure.
Figure 4B:
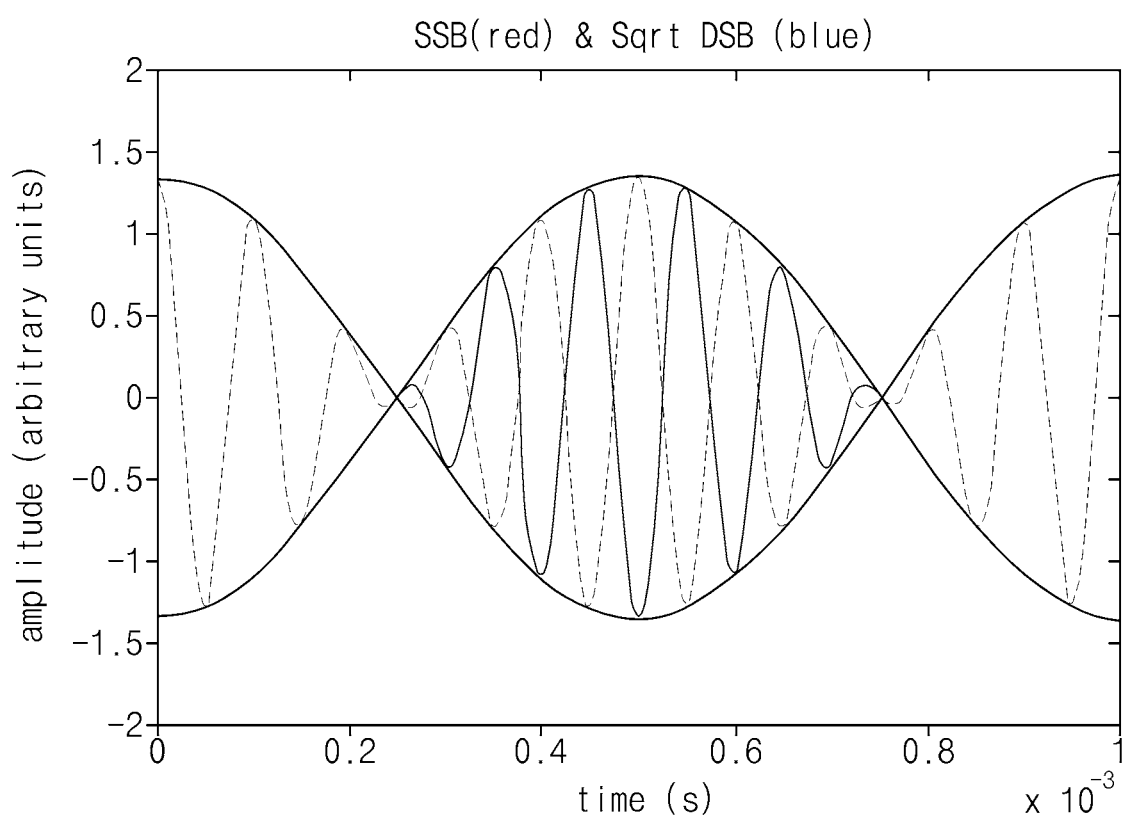
FIG. 4B is a drawing illustrating a cross waveform according to exemplary embodiments of the present disclosure.

FIG. 1 is a block diagram illustrating a configuration of a mosquito repellent system according to exemplary embodiments of the present disclosure. FIG. 2A and FIG. 2B are drawings illustrating examples of mounting an ultrasonic device according to exemplary embodiments of the present disclosure; FIGS. 3A and 3B are drawings illustrating a structure of an ultrasonic device according to exemplary embodiments of the present disclosure. FIG. 4A is a drawing illustrating a single waveform according to exemplary embodiments of the present disclosure. FIG. 4B is a drawing illustrating a cross waveform according to exemplary embodiments of the present disclosure.

A mosquito repellent system 100 is developed based on the prior research result that Johnston's organ which is the hearing organ of the mosquito detects an ultrasonic wave, which may repel the mosquito using the ultrasonic wave. The mosquito repellent system 100 may be loaded into a vehicle. For example, the mosquito repellent system 100 may be inserted into a roof trim, a door trim, a seat, a tailgate trim, and/or the like.

Referring to FIG. 1, the mosquito repellent system 100 may include a user interface device 110, a passenger detection device 120, a mosquito recognition device 130, a first ultrasonic device 140, a second ultrasonic device 150, a communication device 160, and a control device 170. Each of the devices 110 to 170 may include at least one processor. The at least one processor may be implemented as an application specific integrated circuit (ASIC), a central processing unit (CPU), a microcontroller, a microprocessor, and/or the like. Each of the devices 110 to 170 may further include a non-transitory storage medium which stores instructions executed by the at least one processor. The non-transitory storage medium may include a flash memory, a hard disk, a solid state disk (SSD), a random access memory (RAM), a static RAM (SRAM), a read only memory (ROM), a programmable ROM (PROM), an electrically erasable and programmable ROM (EEPROM), an erasable and programmable ROM (EPROM), and/or the like.

The user interface device 110 may be a device which helps the mosquito repellent system 100 and a user (e.g., a driver, a passenger, or the like) to interact with each other. The user interface device 110 may include an input device (e.g., a keyboard, a touch pad, a microphone, a touch screen, and/or the like) for generating data according to manipulation of the user, an output device (e.g., a display, a speaker, a tactile signal output device, and/or the like) for outputting information according to an operation of the mosquito repellent system 100, and/or the like. Such a user interface device 110 may be implemented as an audio, video, navigation (AVN) terminal, an in-vehicle infotainment terminal, a telematics terminal, and/or the like.

The user interface device 110 may generate data for operating or pausing (or stopping) the mosquito repellent system 100. In other words, the user interface device 110 may include a function selection button capable of turning on or off a mosquito repellent function. The function selection button may be implemented as a hardware button, a soft button (or a soft key), or the like.

The passenger detection device 120 may detect a passenger in the vehicle to detect information about the passenger (i.e., passenger information). The passenger information may include a passenger position in the vehicle (i.e., a seat where the passenger sits), the number of passengers, a sitting posture (or a seating posture), and/or the like. The passenger detection device 120 may detect a passenger position (or a seating position), the number of passengers, and/or the like using a sitting sensor (e.g., a load sensor), a camera, and/or the like. The passenger detection device 120 may receive an angle (or a gradient) of a seat back and a seat position (or a sliding position) in a longitudinal direction of the vehicle from a seat control device (not show). The passenger detection device 120 may recognize a sitting posture of the passenger based on the seat position, the angle of the seat back, and/or the like.

The mosquito recognition device 130 may recognize mosquito appearance using the camera and/or the ultrasonic sensor. In other words, the mosquito recognition device 130 may analyze an image and/or a sound obtained by the camera and/or the ultrasonic sensor and may detect whether there is a mosquito in the vehicle.

The mosquito recognition device 130 may recognize the mosquito appearance in the vehicle using a mosquito appearance recognition algorithm. The mosquito recognition device 130 may obtain a sound wave by means of the ultrasonic sensor. The mosquito recognition device 130 may obtain a waveform of the sound wave based on signal processing of the obtained sound wave. The signal processing may be a preprocessing process for analyzing the sound wave using a long short term memory (LSTM) algorithm or the like. The mosquito recognition device 130 may determine whether the obtained waveform of the sound wave is a waveform of a mosquito sound. The mosquito recognition device 130 may determine that the mosquito appears, when it is determined that the obtained waveform of the sound wave is the waveform of the mosquito sound.

The mosquito appearance recognition algorithm may be a process of selecting whether the waveform of the sound wave is the waveform of the mosquito sound, which may pass through the following procedure. The mosquito recognition device 130 may set a window length of the waveform of the sound wave. The mosquito recognition device 130 may set a window length of the waveform of the sound wave, that is, a cutting length of the waveform of the sound wave, based on the number of fast Fourier transform (FFT) of the waveform of the sound wave and a predetermined target frequency band. The mosquito recognition device 130 may set an overlapping interval of the waveform of the sound wave. In other words, the mosquito recognition device 130 may determine to cut the waveform of the sound wave in a state where there is some degree of overlap. The mosquito recognition device 130 may set an overlapping interval based on the set window length and frame_stride. The mosquito recognition device 130 may calculate the number of frames in the waveform of the sound wave based on a total time of the waveform of the sound wave and the frame_stride. The mosquito recognition device 130 may extract a Mel spectrogram of the waveform of the sound wave. The mosquito recognition device 130 may identify whether the waveform of the sound wave is a waveform of a mosquito sound based on the extracted Mel spectrogram. Furthermore, the mosquito recognition device 130 may ascertain (or identify) a position of a mosquito through the process of extracting the Mel spectrogram of the waveform of the sound wave.

Furthermore, the mosquito recognition device 130 may analyze an image obtained by the camera and may detect a position of the mosquito in the vehicle. The mosquito recognition device 130 may analyze a mosquito sound using the ultrasonic sensor and may detect a position of the mosquito in the vehicle. The mosquito recognition device 130 may integrate the mosquito position detected by the ultrasonic sensor and the mosquito position detected by the camera and may deliver the integrated mosquito position to the control device 170.

The first ultrasonic device 140 and the second ultrasonic device 150 may generate and radiate an ultrasonic wave. The first ultrasonic device 140 and the second ultrasonic device 150 may be fixed and installed at different positions in the vehicle. For example, the first ultrasonic device 140 may be inserted into a roof trim in the front of a room lamp as shown in FIG. 2A, and the second ultrasonic device 150 may be inserted into a roof trim around a rear lamp as shown in FIG. 2B.

Each of the first ultrasonic device 140 and the second ultrasonic device 150 may include at least two or more ultrasonic vibrators (or ultrasonic transducers). For example, the first ultrasonic device 140 may include two ultrasonic vibrators 230 mounted to be spaced apart from each other at a predetermined interval on one surface 201 of a housing 200 as shown in FIG. 3A. The second ultrasonic device 150 may include three ultrasonic vibrators 230 respectively installed in one surface 203 of the housing 200 and inclined surfaces 205 and 207 connected with its both ends as shown in FIG. 3B. In some embodiments, the surfaces 205 and 207 may be flat to the surface 203. In some embodiments, each of the first ultrasonic device 140 and the second ultrasonic device 150 may include a single ultrasonic vibrator (or ultrasonic transducer). The number and arrangement of the ultrasonic vibrator(s) and the configuration of the ultrasonic device(s) may vary depending on the application.

Referring to FIGS. 3A and 3B, a printed circuit board (PCB) 210 may be disposed on a lower surface at an inner side of the housing 200 of each of the first ultrasonic device 140 and the second ultrasonic device 150. A support 220 supporting the ultrasonic vibrators 230 may be disposed on the PCB 210. The support 220 may be rounded in the shape of a ball bearing. The ultrasonic vibrators 230, each of which has a lower end which is rounded, may be arranged on an upper end of the support 220. Each of the ultrasonic vibrators 230 may be configured to rotate on its own on a matching surface of the support 220.

The communication device 160 may support to establish a wired and/or wireless communication channel between the mosquito repellent system 100 and an external device (e.g., an electronic control unit (ECU)) and perform communication over the established communication channel. The communication device 160 may include a wireless communication circuit (e.g., a cellular communication circuit, a Wi-Fi communication circuit, a short-range wireless communication circuit, or a global navigation satellite system (GNSS) communication circuit) and/or a wired communication circuit (e.g., a local area network (LAN) communication circuit or a power line communication circuit).

The control device 170 may control at least one of the first ultrasonic device 140 or the second ultrasonic device 150, or any combination thereof. Such a control device 170 may include a driving signal generator 171, a modulator 172, and a controller 173.

The driving signal generator 171 may generate a driving signal for driving an ultrasonic vibrator. The driving signal generator 171 may generate a driving signal using an oscillator or the like.

The modulator 172 may modulate amplitude of the driving signal and may output the modulated driving signal. The modulator 172 may modulate amplitude to adjust a parameter of a frequency carrier of the driving signal to increase the output efficiency of the ultrasonic vibrator. The modulator 172 may modulate amplitude of a carrier depending on amplitude of analog data. According to an exemplary embodiment, the modulator 172 may use a double side band (DSB) and a single side band (SSB).

The controller 173 may adjust output timings of the signals modulated by the modulator 172, that is, modulation signals to determine an ultrasonic output pattern. The controller 173 may adjust the output timings of the modulation signals such that an output duration of each of the modulation signals is included at least once in a unit duration.

The controller 173 may include a processor (e.g., an ASIC, a CPU, a microcontroller, or a microprocessor). The processor 173 may be a non-transitory storage medium which stores instructions executed by the processor. The non-transitory storage medium may include a flash memory, a hard disk, an SSD, a RAM, an SRAM, a ROM, a PROM, an EEPROM, an EPROM, an/or the like.

The controller 173 may operate the mosquito repellent system 100 depending on a command input from the outside. As an example, when receiving a command to turn on a mosquito repellent function from the user interface device 110, the controller 173 may operate the mosquito repellent system 100. As another example, when the passenger in the vehicle is detected by the passenger detection device 120 and when the mosquito in the vehicle is detected by the mosquito recognition device 130, the controller 173 may operate the mosquito repellent system 100.

The controller 173 may sense an interior environment and a driving environment of the vehicle using various sensors (e.g., a camera, light detection and ranging (LiDAR), radio detecting and ranging (RADAR), a wheel speed sensor, and/or the like) loaded into the vehicle. For example, the controller 173 may detect whether the vehicle is in a driving state or a stop state using a speed sensor, a shift gear position sensor, and/or the like.

The controller 173 may recognize (or detect) at least one of the number of passengers who ride in the vehicle, positions (or seating positions) of the passengers, or sitting postures of the passengers, or any combination thereof by means of the passenger detection device 120.

The controller 173 may recognize whether a mosquito appears in the vehicle by means of the mosquito recognition device 130. In other words, the controller 173 may recognize whether there is a mosquito in the vehicle based on data transmitted from the mosquito recognition device 130. Furthermore, the controller 173 may obtain a mosquito position, a mosquito distribution degree, and/or the like in the vehicle by means of the mosquito recognition device 130.

When the mosquito repellent function is turned on, the controller 173 may determine whether a seat position in the vehicle and an angle of a seat back in the vehicle are under-adjusted. In other words, the controller 173 may determine a sitting posture of the passenger. The sitting posture may be divided into a seating posture (or a right posture) and a sleeping posture (or a lying-down posture). When the change in seat position in the vehicle is within a predetermined reference position range and when the change in angle of the seat back is within a predetermined reference angle range, the controller 173 may determine that the seat is under-adjusted. At this time, the controller 173 may determine the sitting posture of the passenger as the seating posture. When the change in seat position is out of the reference position range, when the change in angle of the seat back is out of the reference angle range, or when the change in seat position is out of the reference position range and the change in angle of the seat back is out of the reference angle range, the controller 173 may determine that the seat is not under-adjusted. At this time, the controller 173 may determine the sitting posture of the passenger as the sleeping posture.

When it is determined that the seat is under-adjusted, the controller 173 may drive only the first ultrasonic device 140. When it is determined that the seat is not under-adjusted, the controller 173 may control the first ultrasonic device 140 and/or the second ultrasonic device 150 based on the passenger position.

The controller 173 may determine whether there is a passenger in only the first row seat (i.e., the driver's seat and/or the passenger seat) of the vehicle. When it is determined that there is the passenger in only the first row seat, the controller 173 may operate the first ultrasonic device 140 and may operate at least some of the ultrasonic vibrators of the second ultrasonic device 150.

The controller 173 may determine whether there is a passenger in the second row seat. When it is determined that there is the passenger in the second row seat, the controller 173 may operate all the ultrasonic vibrators of the second ultrasonic device 150.

The controller 173 may determine whether there is a passenger in the third row seat. When it is determined that there is the passenger in the third row seat, the controller 173 may control the first and second ultrasonic devices 140 and 150 to radiate an ultrasonic wave to the door glass. At this time, the ultrasonic wave radiated from the first and second ultrasonic devices 140 and 150 may reverberate from the door glass to repel the mosquito located around the passenger sitting in the third row seat.

The controller 173 may apply a waveform of the ultrasonic wave to a single waveform and/or a cross waveform using an ultrasonic power variable control algorithm.

When only the driver rides in the vehicle, the controller 173 may operate the first ultrasonic device 140 and may fail to operate the second ultrasonic device 150. At this time, the first ultrasonic device 140 may generate a sweep waveform under control of the controller 173. Furthermore, the first ultrasonic device 140 may transmit a variable frequency of 25 KHz to 35 KHz. As a result, when only the driver rides in the vehicle, the mosquito repellent system 100 may maximize a mosquito repellent effect depending on the maximum power and the variable frequency sweep waveform at the beginning of mosquito appearance.

When an angle of the seat back of the first row seat in which the passenger sits is out of the reference angle range or when the passenger rides in the second row seat, the controller 173 may operate the second ultrasonic device 150 and may stop the first ultrasonic device 140. The controller 173 may take care of the back of the head of the passenger (or the driver) who rides in the first row seat or may take care of the passenger who rides in the second row seat, using the second ultrasonic device 150. The second ultrasonic device 150 may radiate a single waveform having a target frequency as shown in FIG. 4A. At this time, the target frequency may be determined as a frequency, for example, 30 KHz, which is effective against mosquito repellent by the resonance of the mosquito hearing organ, based on a mosquito avoidance rate result according to the ultrasonic band. The target frequency may be selected through efficacy evaluation in vehicle test conditions in which high temperature, high humidity, and lighting are optimized for various mosquitoes such as red house mosquitoes and white-lined mosquitoes. As such, the mosquito repellent system 100 may maximize an effect which causes mosquitoes to run away or faint by means of a change in an ultrasonic output (e.g., sound pressure) which is output to the first row seat and/or the second row seat.

The controller 173 may operate the first ultrasonic device 140 and the second ultrasonic device 150 to play a variable frequency and a killing frequency as a cross waveform as shown in FIG. 4B. The variable frequency may be determined as a band frequency of 25 KHz to 35 KHz with regard to a resonant frequency distribution for various mosquitoes around the world.

The controller 173 may detect a mosquito distribution degree (or a mosquito appearance degree) using the mosquito recognition device 130. The controller 173 may optimize power and/or a waveform based on the mosquito distribution degree and may set a radiation angle. The controller 173 may control the first ultrasonic device 140 and/or the second ultrasonic device 150 to radiate an ultrasonic signal of a sound pressure level of 125 dB to 130 dB at the beginning based on the mosquito distribution degree. After a predetermined time elapses, the controller 173 may control the first ultrasonic device 140 and/or the second ultrasonic device 150 to radiate an ultrasonic signal having a sound pressure level of 110 dB. The controller 173 may set an ultrasonic radiation angle of the first ultrasonic device 140 and/or an ultrasonic radiation angle of the second ultrasonic device 150 to take care of a face, an arm, and a leg portion of the passenger. Furthermore, the controller 173 may set the waveform of the ultrasonic signal to a sweep mode of 25 KHz to 35 KHz.

The controller 173 may perform mosquito repellent using a door glass interworking control algorithm. The controller 173 may detect a mosquito depending to the door glass interworking control algorithm and may ascertain a mosquito position. The controller 173 may determine whether there is a mosquito within a window threshold distance based on the ascertained mosquito position. When it is determined that there is the mosquito within the window threshold distance, the controller 173 may open the window and may control the first ultrasonic device 140 and/or the second ultrasonic device 150 to radiate an ultrasonic wave. Thereafter, the controller 173 may verify whether the mosquito remains the vehicle. When it is verified that the mosquito remains in the vehicle, the controller 173 may radiate an ultrasonic wave again and may open a door window close to the mosquito position.

Figure 5:
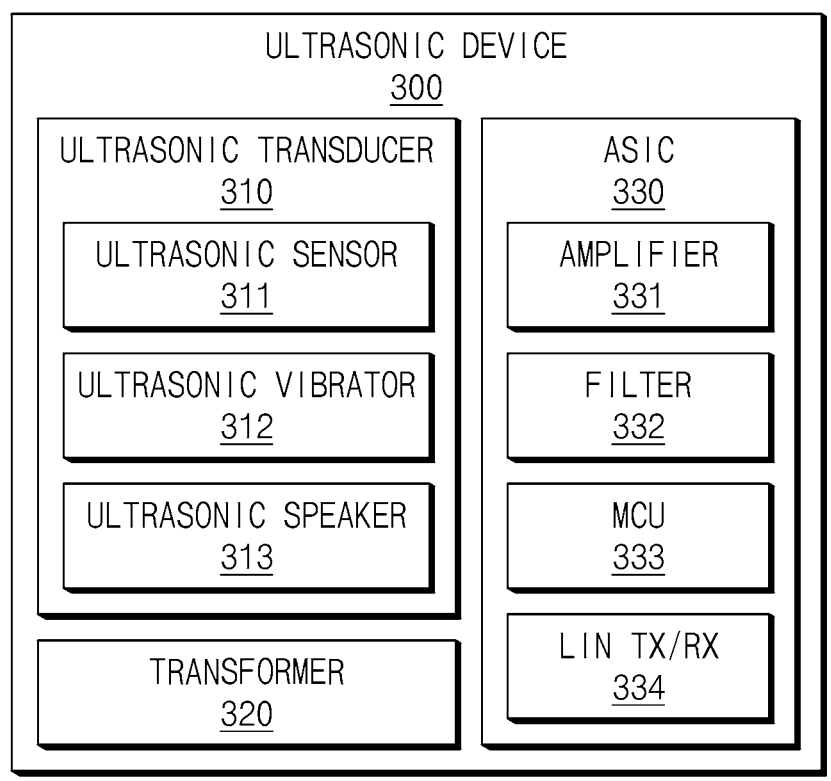
FIG. 5 is a block diagram illustrating a configuration of an ultrasonic device according to exemplary embodiments of the present disclosure.

FIG. 5 is a block diagram illustrating a configuration of an ultrasonic device according to exemplary embodiments of the present disclosure.

Each of a first ultrasonic device 140 and a second ultrasonic device 150 shown in FIG. 1 may be configured as an ultrasonic device 300. The ultrasonic device 300 may be inserted into a roof trim, a door trim, a seat, a tailgate trim, and/or the like in a vehicle. The ultrasonic device 300 may be applied to a road noise active noise control (RANC) sensor position. Referring to FIG. 5, the ultrasonic device 300 may include an ultrasonic transducer 310, a transformer 320, and an ASIC 330. The ASIC 330 may include an amplifier 331, a filter 332, a micro controller (MCU) 333, and/or a local inter connect network (LIN) TX/RX 334.

The ultrasonic transducer 310 may include an ultrasonic sensor 311, an ultrasonic vibrator 312, and/or an ultrasonic speaker 313. The case where the one ultrasonic sensor 311, the one ultrasonic vibrator 312, and/or the one ultrasonic speaker 313 are/is applied is described as an example, but not limited thereto.

The ultrasonic sensor 311 may transmit an ultrasonic signal based on control of a control device 170 of FIG. 1 and may receive a signal (i.e., a reflection signal) reflected from a target (e.g., a mosquito). The control device 170 may identify a position of the target and/or a distance from the target. The ultrasonic sensor 311 may be located (or inserted) in a portion of the vehicle.

The ultrasonic vibrator 312 may optimize ultrasonic power and/or ultrasonic sensitivity depending on the frequency and/or the waveform determined by a mosquito repellent system 100 of FIG. 1. The ultrasonic vibrator 312 may be divided into a pin type and a wire type.

When the pin-type ultrasonic vibrator is applied to the ultrasonic vibrator 312, the ultrasonic vibrator 312 may be manufactured in a slip type with a width of about 10 mm. At least two ultrasonic vibrators 312 may be mounted on the one ultrasonic device 300. Radiation angles of the at least two ultrasonic vibrators 312 may be set to angles optimized for the face, the arms, and the leg of a passenger.

When the wire-type ultrasonic vibrator is applied to the ultrasonic vibrator 312, the ultrasonic vibrator 312 may be coupled to a connector to widely set an installation position.

The ultrasonic speaker 313 may serve as an amplifier (AMP) which amplifies an ultrasonic signal. The ultrasonic speaker 313 may maximize power and may optimize a radiation angle to form a mosquito repellent sound field through reverberation from a door glass.

The transformer 320 may convert an electrical signal output from the ASIC 330 into an ultrasonic signal.

The ASIC 330 may output the ultrasonic signal to the outside through the ultrasonic transducer 310. The ASIC 330 may play and deliver a mosquito repellent sound source, that is, an ultrasonic sound source to the ultrasonic transducer 310. The ultrasonic transducer 310 may amplify and output the played ultrasonic sound source (or the ultrasonic signal).

The MCU 333 of the ASIC 330 may perform signal processing of the ultrasonic signal received through the ultrasonic sensor 311. For example, the ASIC 330 may amplify and/or filter the received ultrasonic signal using the amplifier 331 and/or the filter 332.

The MCU 333 of the ASIC 330 may transmit and receive a signal (or data) with an external device (e.g., a control device 170 of FIG. 1) through the LIN TX/RX 334. The MCU 333 may transmit the ultrasonic signal, the signal processing of which is performed, to the control device 170.

Figure 6:
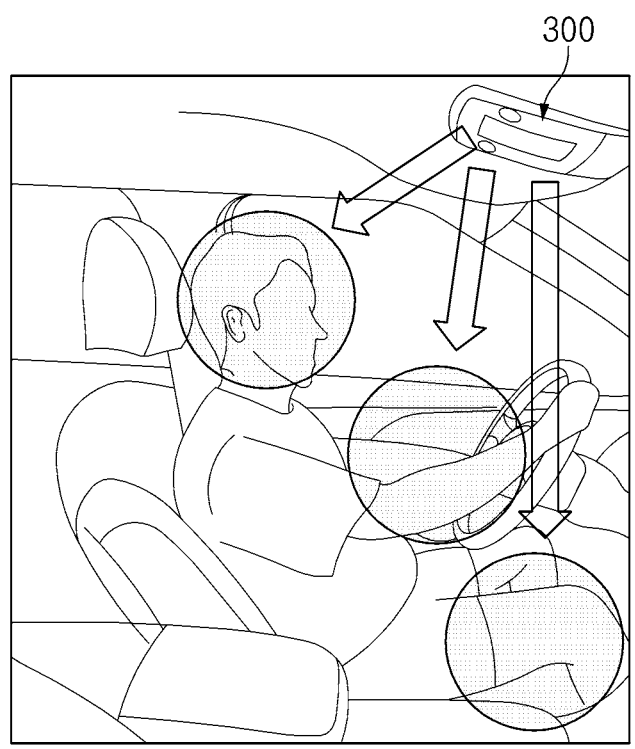
FIG. 6 is a drawing illustrating an example of radiating an ultrasonic wave depending on a sitting posture according to exemplary embodiments of the present disclosure.
Figure 7:
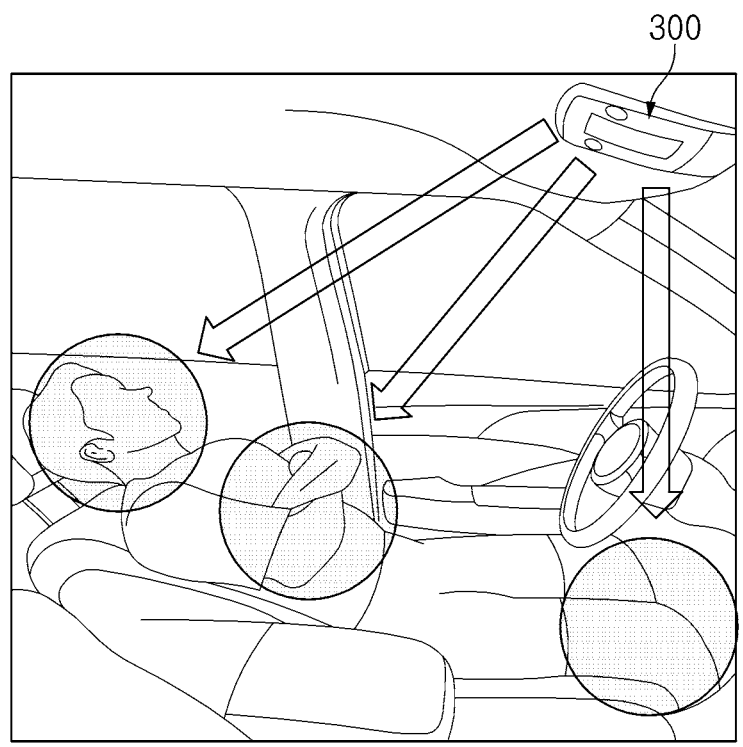
FIG. 7 is a drawing illustrating another example of radiating an ultrasonic wave depending on a sitting posture according to exemplary embodiments of the present disclosure.

FIG. 6 is a drawing illustrating an example of radiating an ultrasonic wave depending on a sitting posture according to exemplary embodiments of the present disclosure. FIG. 7 is a drawing illustrating another example of radiating an ultrasonic wave depending to a sitting posture associated with the present disclosure.

Referring to FIG. 6, when it is determined that the sitting posture is a seating posture, a control device 170 of FIG. 1 may determine a care mode as a driving mode. When the care mode is determined as the driving mode, the control device 170 may adjust an angle of an ultrasonic vibrator of an ultrasonic device to an ultrasonic radiation angle matched with the driving mode and may take care of the face, hands, and legs of a passenger.

Referring to FIG. 7, when it is determined that the sitting posture is a sleeping posture, the control device 170 may determine a care mode as a lying-down mode. When the care mode is determined as the lying-down mode, the control device 170 may adjust an angle of the ultrasonic vibrator of the ultrasonic device to an ultrasonic radiation angle matched with the lying-down mode and may take care of the face, hands, and legs of the passenger.

The control device 170 may optimize power and/or a waveform of an ultrasonic signal as well as the ultrasonic radiation angle.

Figure 8:
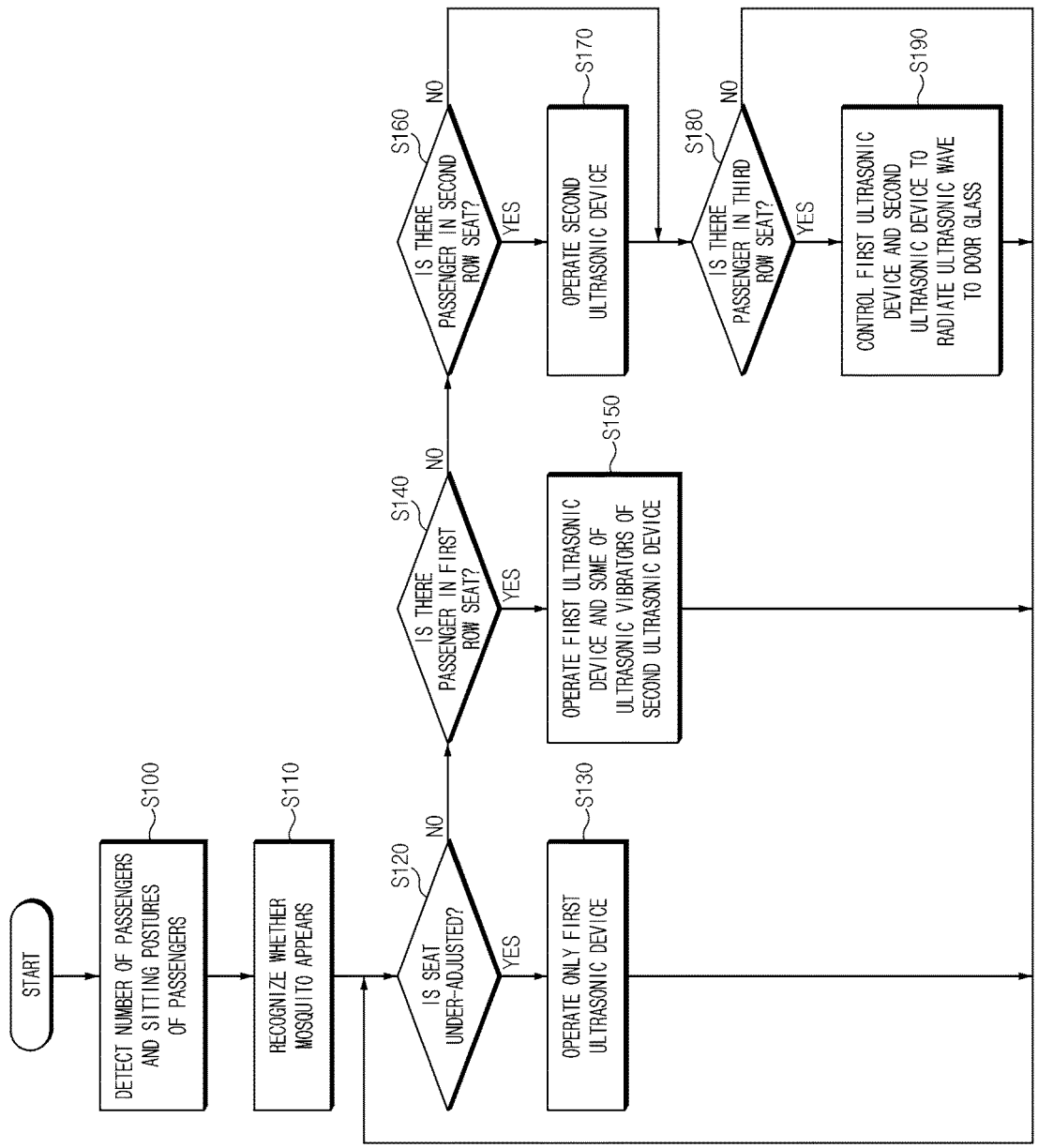
FIG. 8 is a flowchart illustrating a method for operating a mosquito repellent system according to an exemplary embodiment of the present disclosure.
Figure 9:
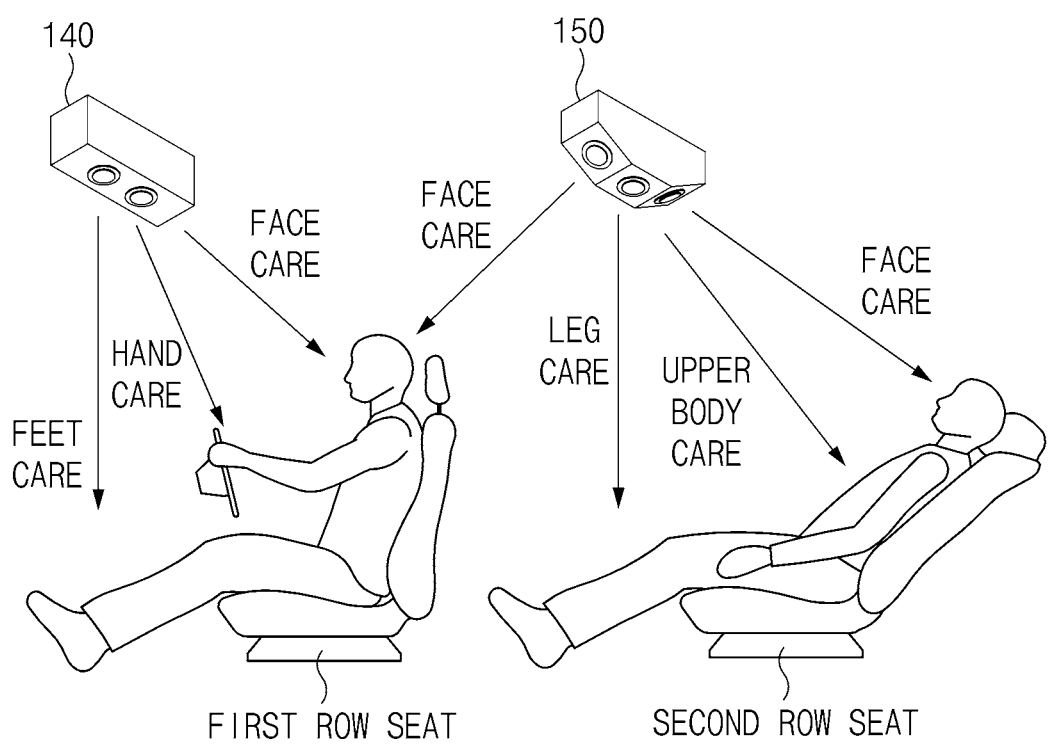
FIG. 9 is a drawing illustrating an example of controlling an ultrasonic device according to an exemplary embodiment of the present disclosure.

FIG. 8 is a flowchart illustrating a method for operating a mosquito repellent system according to an exemplary embodiment of the present disclosure. FIG. 9 is a drawing illustrating an example of controlling an ultrasonic device according to an exemplary embodiment of the present disclosure.

In S100, a control device 170 of a mosquito repellent system 100 of FIG. 1 may detect the number of passengers in a vehicle and sitting postures of the passengers. When receiving a command to turn on a mosquito repellent function from a user interface device 110 of FIG. 1, the control device 170 may sense an interior environment and a driving environment of the vehicle using a camera, RADAR, and the like. The control device 170 may recognize (or detect) at least one of the number of passengers who ride in the vehicle, a passenger position, or a sitting posture, or any combination thereof by means of a passenger detection device 120 of FIG. 1. The control device 170 may sense a sitting posture with regard to a seat position in a longitudinal direction of the vehicle (or a longitudinal position), an angle of a seat back, and the like.

In S110, the control device 170 may recognize whether a mosquito appears in the vehicle by means of a mosquito recognition device 130 of FIG. 1. The control device 170 may recognize whether there is a mosquito in the vehicle based on data transmitted from the mosquito recognition device 130.

In S120, the control device 170 may determine whether a seat is under-adjusted. The control device 170 may determine whether the seat position in the vehicle and the angle of the seat back in the vehicle are under-adjusted. When the seat position in the vehicle is within a predetermined reference position range and when the angle of the seat back is within a predetermined reference angle range, the control device 170 may determine that the seat is under-adjusted. When the seat position is out of the reference position range, when the angle of the seat back is out of the reference angle range, or when the seat position is out of the reference position range and when the angle of the seat back is out of the reference angle range, the control device 170 may determine that the seat is not under-adjusted.

When it is determined that the seat is under-adjusted, in S130, the control device 170 may drive only the first ultrasonic device 140. When it is determined that the seat is not under-adjusted, the control device 170 may control the first ultrasonic device 140 and/or the second ultrasonic device 150 based on the passenger position.

In S140, the control device 170 may determine whether there is a passenger in only the first row seat (i.e., the driver's seat and/or the passenger seat) of the vehicle. The control device 170 may determine whether there is a passenger in only the first row seat based on the seating position of the passenger, which is obtained by the passenger detection device 120.

When it is determined that there is the passenger in only the first row seat, in S150, the control device 170 may operate the first ultrasonic device 140 and may operate at least some of the ultrasonic vibrators of the second ultrasonic device 150. Referring to FIG. 9, the first ultrasonic device 140 may radiate an ultrasonic signal to the face, hands, and legs of the passenger who rides in the first row seat, and at least some of the ultrasonic vibrators of the second ultrasonic device 150 may radiate an ultrasonic signal to the back of the head of the passenger which rides in the first row seat, thus repelling the mosquito.

When it is determined that there is no passenger in the first row seat in S140, in S160, the control device 170 may determine whether there is a passenger in the second row seat. When it is determined that there is the passenger in another seat other than the first row seat, the control device 170 may determine whether there is a passenger in the second row seat.

When it is determined that there is the passenger in the second row seat, in S170, the control device 170 may operate all the ultrasonic vibrators of the second ultrasonic device 150. The control device 170 may adjust radiation angles of the ultrasonic vibrators in the second ultrasonic device 150 to radiate an ultrasonic signal to the head, arms, and legs of the passenger which rides in the second row seat (refer to FIG. 9).

After S170 or when it is determined that there is no passenger in the second row seat, in S180, the control device 170 may determine whether there is a passenger in the third row seat. The example of verifying whether there are passengers in the first to third row seats is described in the present embodiment, but not limited thereto. The present embodiment may be applied even when there are four row seats or more in the vehicle.

When it is determined that there is the passenger in the third row seat, in S190, the control device 170 may control the first and second ultrasonic devices 140 and 150 to radiate an ultrasonic wave to the door glass. At this time, the ultrasonic wave radiated from the first and second ultrasonic devices 140 and 150 may reverberate from the door glass to repel the mosquito located around the passenger sitting in the third row seat.

Figure 10:
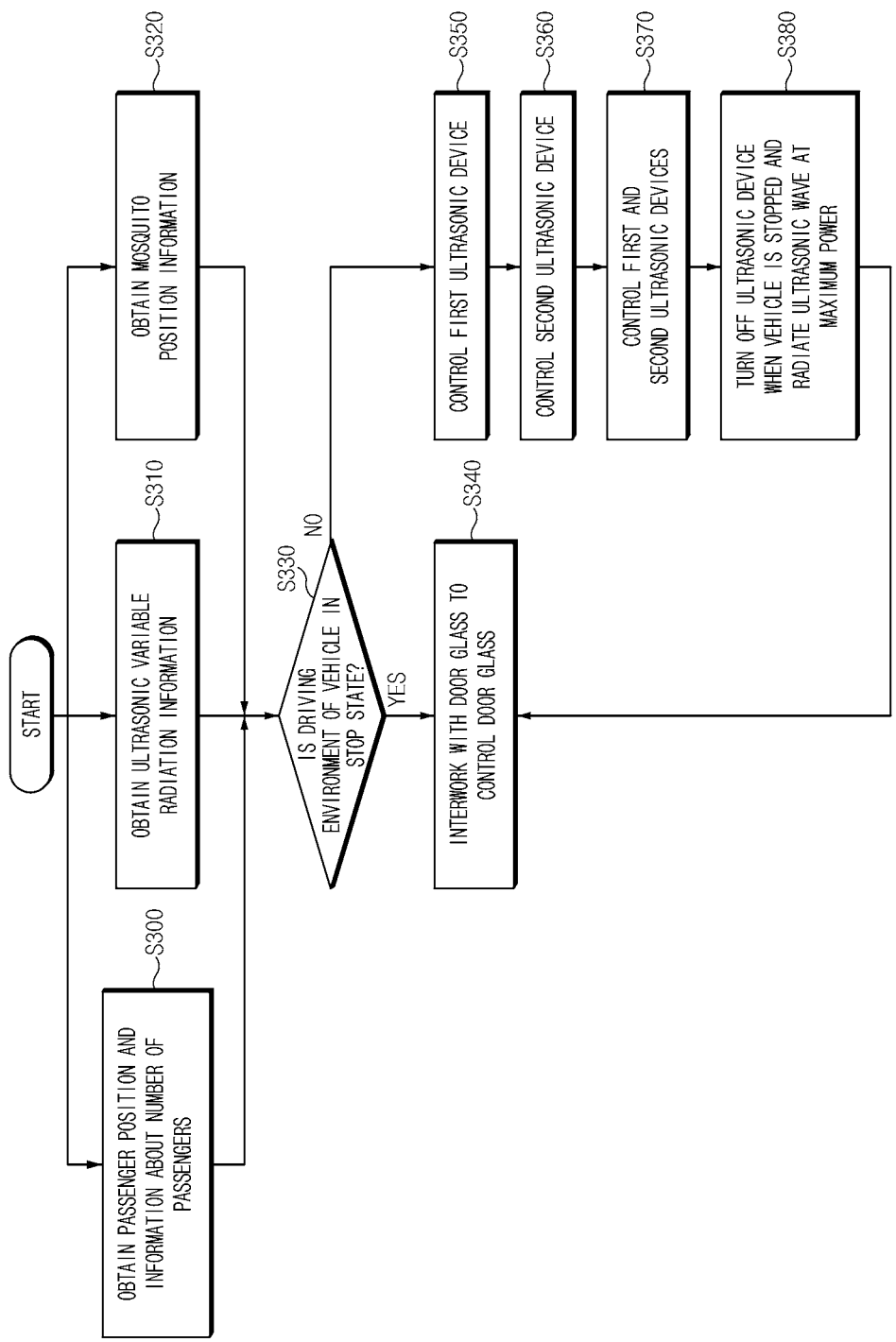
FIG. 10 is a flowchart illustrating a method for operating a mosquito repellent system according to another embodiment of the present disclosure.

FIG. 10 is a flowchart illustrating a method for operating a mosquito repellent system according to another embodiment of the present disclosure.

In S300, a control device 170 of FIG. 1 may obtain a passenger position in a vehicle and information about the number of passengers. The control device 170 may detect a passenger position and the number of passengers by means of a passenger detection device 120 of FIG. 1.

In S310, the control device 170 may obtain ultrasonic variable radiation information. The control device 170 may obtain the ultrasonic variable radiation information in a frequency and pattern scheme.

In S320, the control device 170 may obtain mosquito position information using a camera and/or an ultrasonic sensor.

In S330, the control device 170 may determine whether a vehicle driving environment is in a stop state.

When it is determined that the vehicle driving environment is in the stop state, in S340, the control device 170 may interwork with a door glass to control the door glass.

When it is determined that the vehicle driving environment is not in the stop state in S330, in S350, the control device 170 may control a first ultrasonic device 140 of FIG. 1. When it is determined that the vehicle driving environment is in a driving state, the control device 170 may control the first ultrasonic device 140 to radiate an ultrasonic signal to the arms and legs of a passenger. At this time, the control device 170 may control the first ultrasonic device 140 to radiate maximum power of the ultrasonic signal at 32 V. A mosquito located around the arms and legs of the passenger may run away to the periphery of the head of the passenger and a seat back by the ultrasonic signal radiated from the first ultrasonic device 140. The control device 170 may optimize an output waveform of the ultrasonic signal for passenger customized control.

In S360, the control device 170 may control a second ultrasonic device 150 of FIG. 1 to radiate an ultrasonic signal of 26 V. The control device 170 may separately control the second ultrasonic device 150, when there is a passenger in an ultrasonic radiation area and when there is no passenger in the ultrasonic radiation area, with regard to an ultrasonic radiation pattern, a sitting posture of the passenger, and a seat position. For example, when there is only a driver, the control device 170 may operate only an ultrasonic transducer in the front of the second ultrasonic device 150. When there is a passenger in the rear seat, the control device 170 may operate all of three ultrasonic transducers in the second ultrasonic device 150. At this time, the mosquito may run away to a door glass or a roof edge part. The control device 170 may set a radiation angle. When there is no passenger in the ultrasonic radiation area, the control device 170 may turn off (or fail to operate) the second ultrasonic device 150.

In S370, the control device 170 may control the first ultrasonic device 140 and the second ultrasonic device 150 to radiate a cross waveform. When the first ultrasonic device 140 and the second ultrasonic device 150 radiate the ultrasonic signal as the cross waveform, a sound field of the ultrasonic wave may be formed by a reverberation effect. The mosquito may faint and may fail to move by the ultrasonic signal which reverberates (or multiply reflected) from front, side, and rear glass surfaces of the vehicle.

Thereafter, when the vehicle driving environment switches from the driving state to the stop state, in S380, the control device 170 may turn off or on the first ultrasonic device 140 and the second ultrasonic device 150 to cause the first ultrasonic device 140 and the second ultrasonic device 150 to radiate the ultrasonic signal at maximum power. Next, the control device 170 may interwork with a door glass (or a window) to control the door glass (or the window).

Figure 11:
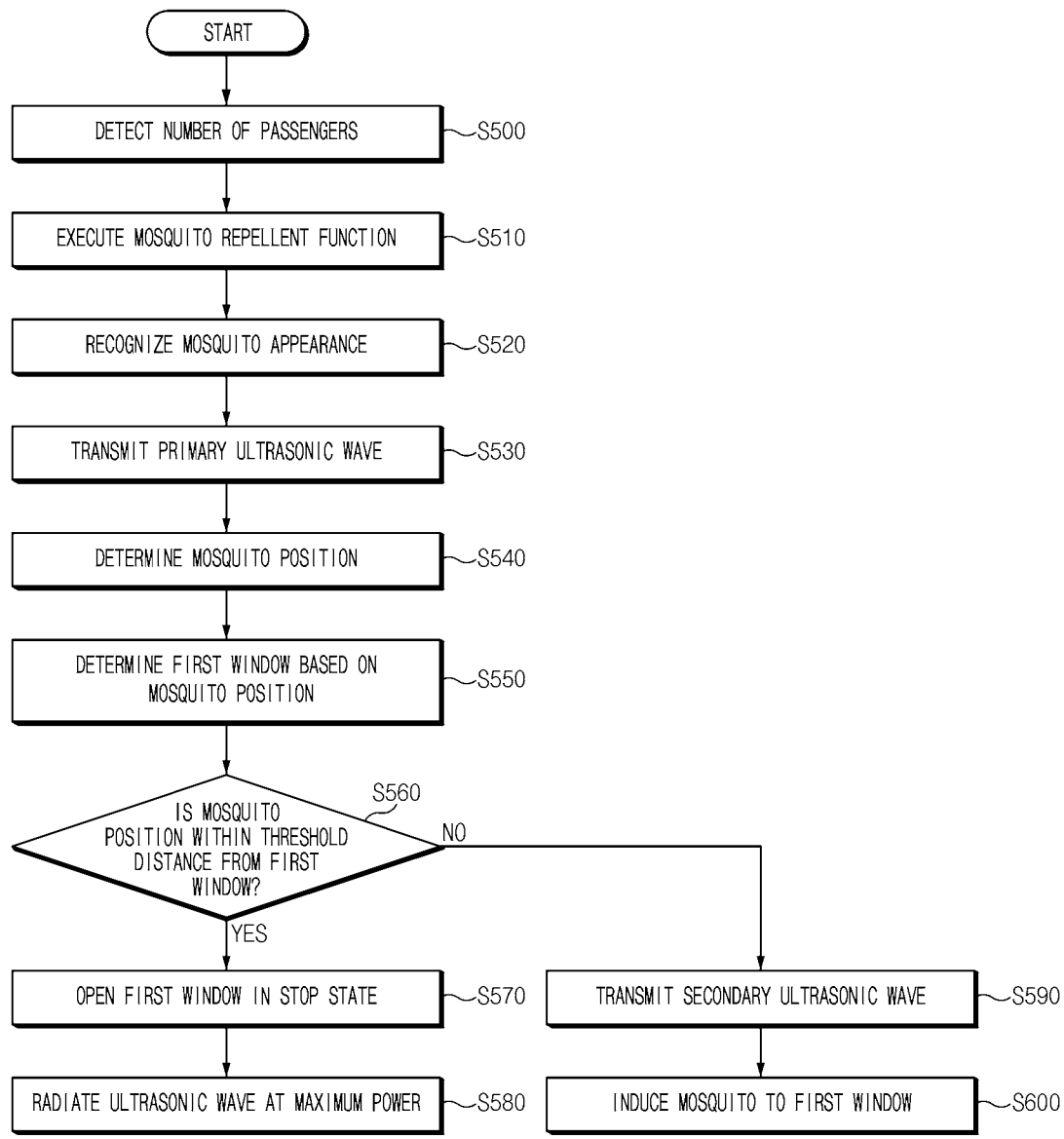
FIG. 11 is a flowchart illustrating a method for operating a mosquito repellent system according to another embodiment of the present disclosure.

FIG. 11 is a flowchart illustrating a method for operating a mosquito repellent system according to another embodiment of the present disclosure.

In S500, a control device 170 of a mosquito repellent system 100 of FIG. 1 may detect the number of passengers in a vehicle. When receiving a command to turn on a mosquito repellent function from a user interface device 110 of FIG. 1, the control device 170 may detect the number of passengers in the vehicle by means of a passenger detection device 120 of FIG. 1.

When the number of the passengers in the vehicle is detected, in S510, the control device 170 may execute the mosquito repellent function. When there is the passenger in the vehicle, the control device 170 may drive the mosquito repellent system 100. When there is no passenger in the vehicle although the command to turn on the mosquito repellent function is received from the user interface device 110, the control device 170 may fail to drive the mosquito repellent system 100.

In S520, the control device 170 may recognize mosquito appearance in the vehicle by means of a mosquito recognition device 130 of FIG. 1. The control device 170 may determine whether there is a mosquito in the vehicle based on data transmitted from the mosquito recognition device 130.

When the mosquito appearance is recognized, in S530, the control device 170 may transmit a primary ultrasonic wave. The primary ultrasonic wave may be to apply an impact on a mosquito using resonance. To this end, a controller 173 of the control device 170 may output an ultrasonic wave by means of an ultrasonic vibrator in the ultrasonic device(s) 140 and/or 150. The controller 173 may operate at least one of at least two ultrasonic vibrators in the ultrasonic device(s) 140 and/or 150.

In S540, the control device 170 may recognize a mosquito position by means of the mosquito recognition device 130. The control device 170 may determine whether there is a mosquito at any location.

In S550, the control device 170 may transmit a first window based on the mosquito position. The control device 170 may determine a window closest to the mosquito position as the first window. For example, when the mosquito position is determined as a driver's seat area, the control device 170 may select a window at the driver's seat as the first window. Alternatively, when the mosquito position is determined as a rear seat area at the passenger seat, the control device 170 may select a window at the rear seat behind the passenger seat as the first window.

In S560, the control device 170 may verify whether the mosquito position is present within a threshold distance from the first window. In other words, the control device 170 may verify whether there is a mosquito within the threshold distance from the first window.

When it is determined that the mosquito position is present within the threshold distance from the first window, in S570, the control device 170 may open the first window in a state where the vehicle is stopped.

In S580, the control device 170 may radiate an ultrasonic wave at maximum power. A possibility that the mosquito which is impacted by the ultrasonic wave radiated at the maximum power will run away out of the vehicle through the opened first window may become very high.

When it is determined that the mosquito position is not present within the threshold distance from the first window, in S590, the control device 170 may transmit a secondary ultrasonic wave. In other words, when the mosquito is out of the threshold distance from the first window, the control device 170 may transmit the secondary ultrasonic wave.

In S600, the control device 170 may guide the mosquito to the first window. The control device 170 may drive the mosquito to the first window in a state where the first window is not opened. Thereafter, the control device 170 may open the first window to cause the mosquito guided to the first window to go out of the vehicle. At this time, the control device 170 may radiate the ultrasonic signal at maximum power.

Figure 12:
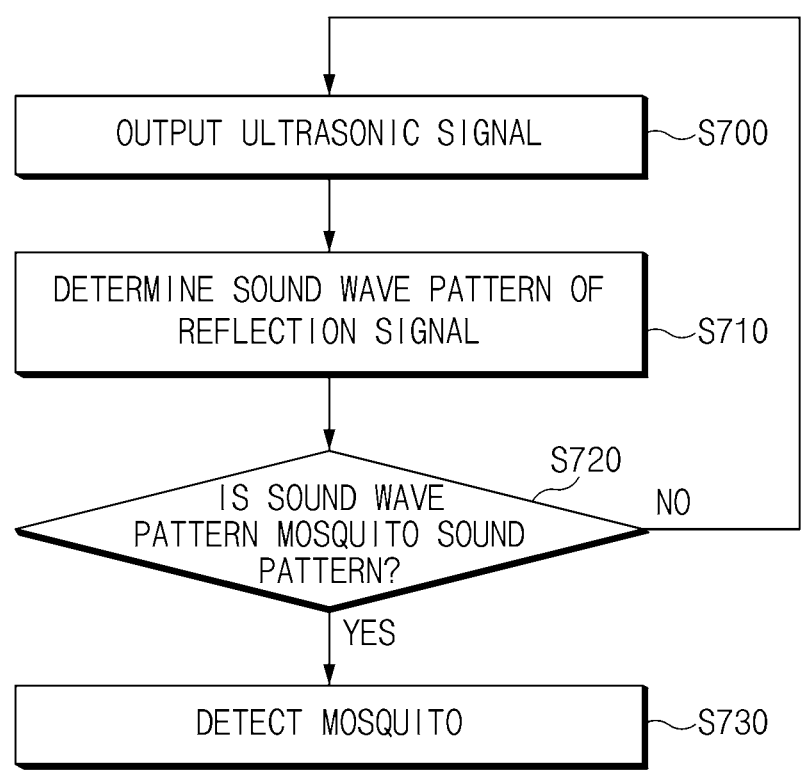
FIG. 12 is a flowchart illustrating a method for recognizing mosquito appearance according to exemplary embodiments of method present disclosure.

FIG. 12 is a flowchart illustrating a method for recognizing mosquito appearance according to exemplary embodiments of method present disclosure.

In S700, a mosquito recognition device 130 of FIG. 1 may output an ultrasonic signal by means of an ultrasonic sensor.

In S710, the mosquito recognition device 130 may determine a sound wave pattern of a reflection signal reflected from a target.

In S720, the mosquito recognition device 130 may determine whether the sound wave pattern corresponds to a mosquito sound pattern.

When it is determined that the sound wave pattern corresponds to the mosquito sound pattern, in S730, the mosquito recognition device 130 may determine that the target corresponds to a mosquito. If not, the mosquito recognition device 130 may repeat S700.

Furthermore, the mosquito recognition device 130 determine a position of the mosquito. When the target is the mosquito in S730, the mosquito recognition device 130 may determine the position of the target.

Figure 13:
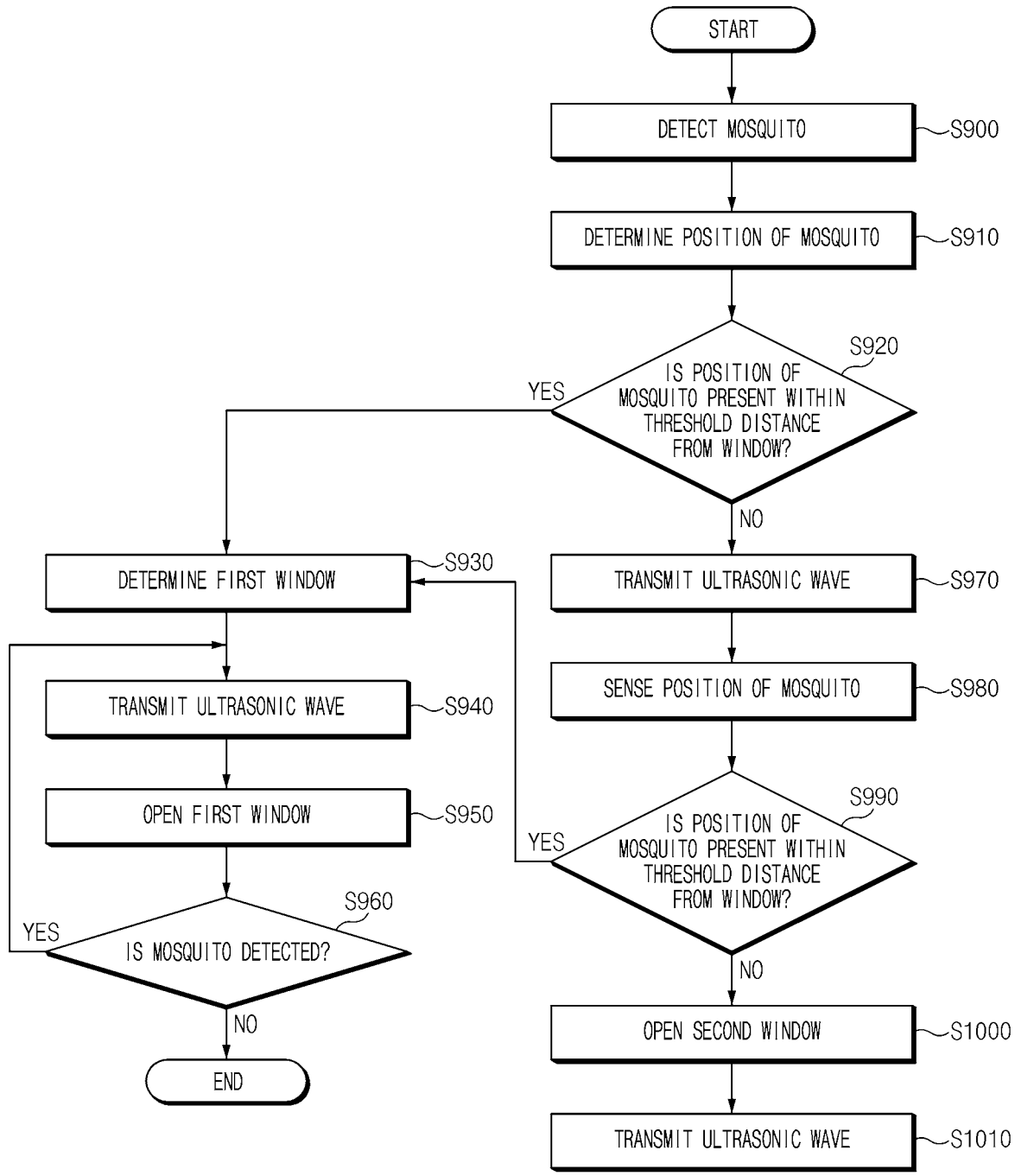
FIG. 13 is a flowchart illustrating a door glass interworking control method according to exemplary embodiments of the present disclosure.

FIG. 13 is a flowchart illustrating a door glass interworking control method according to exemplary embodiments of the present disclosure.

In S900, a control device 170 of FIG. 1 may detect a mosquito by means of a mosquito recognition device 130 of FIG. 1. The mosquito recognition device 130 may transmit an ultrasonic wave by means of an ultrasonic sensor and may determine whether a target is a mosquito based on a signal reflected from the target.

In S910, the control device 170 may recognize a position of the mosquito by means of the mosquito recognition device 130. The ultrasonic sensor may determine a mosquito position on a plane, based on a separation distance and a direction of the mosquito.

In S920, the control device 170 may determine whether the position of the mosquito is present within a threshold distance from a window. The window which is a criterion of determining the mosquito position may be a window closest to the mosquito position. The threshold distance may be predetermined and may be set to a degree to which the mosquito may be easily repelled by the transmission of the ultrasonic wave. According to an exemplary embodiment, the threshold distance may be set to about 15 cm.

When it is determined that the position of the mosquito is present within the threshold distance from the window, in S930, the control device 170 may determine the window as a first window. In other words, the control device 170 may determine the window, which is located within the threshold distance from the position of the mosquito, as the first window.

In S940, the control device 170 may transmit an ultrasonic wave by means of an ultrasonic vibrator.

In S950, the control device 170 may open the first window. To this end, a controller 173 of the control device 170 may generate a first window control signal. The first window control signal may be a control signal capable of directly opening the first window. Alternatively, the first window control signal may be provided to a control module which controls a driving device of the vehicle. The control module may control the first window to be opened.

After transmitting the ultrasonic wave, in S960, the control device 170 may determine whether a mosquito is detected in the vehicle. To this end, the control device 170 may operate the ultrasonic sensor. As described above, the ultrasonic sensor may sense whether there is a mosquito in the vehicle.

When the mosquito is not detected in the vehicle, the control device 170 may end the operation of the mosquito repellent system 100.

When the mosquito is detected in the vehicle, the control device 170 may return to S940.

When there is the mosquito position is greater than the threshold distance from the window in S920, in S970, the control device 170 may transmit an ultrasonic wave by means of ultrasonic vibrators.

In S980, the control device 170 may sense a position of the mosquito again. There is a high possibility that mosquitoes will be impacted and moved by the ultrasonic wave in S970. Thus, the control device 170 may determine whether mosquitoes are close to the window. To this end, the control device 170 may operate the ultrasonic sensor.

In S990, the control device 170 may determine whether the position of the mosquito is present within the threshold distance from the window.

When the position of the mosquito is present within the threshold distance from the window, the control device 170 may proceed with S930.

When it is determined that the position of the mosquito is present within the threshold distance from the window, in S1000, the control device 170 may open a second window. The second window may be selected among windows except for the window closest to the mosquito. The second window may be to drive the mosquito to the window through outer air, which may be selected among windows located in a direction opposite to the window closest to the mosquito.

In S1010, the control device 170 may transmit an ultrasonic wave again. After repelling the mosquito to the area close to the window in S1000, the control device 170 may transmit an ultrasonic wave to apply a secondary impact to the mosquito.

Next, the control device 170 may proceed with S980 again.

Exemplary embodiments of the present disclosure may control an ultrasonic radiation angle based on a sitting posture of a passenger in the vehicle, thus providing care optimized for the sitting posture.

Furthermore, exemplary embodiments of the present disclosure may interwork with a door glass to control the door glass based on the sitting posture of the passenger in a state where the vehicle is stopped, thus effectively repelling mosquitoes.

Furthermore, exemplary embodiments of the present disclosure may control an ultrasonic radiation pattern based on the position of the passenger in the vehicle and the sitting posture of the passenger and may separately control ultrasonic vibrators, thus improving a mosquito repellent effect.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, exemplary embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A mosquito repellent system, comprising:
   a passenger detection device configured to detect a passenger in a vehicle;
   a mosquito recognition device configured to recognize a mosquito;
   a first ultrasonic device and a second ultrasonic device configured to generate and radiate an ultrasonic wave; and
   a control device configured to:
   obtain information about the passenger using the passenger detection device;
   determine whether there is a mosquito in the vehicle using the mosquito recognition device; and
   control at least one of the first ultrasonic device or the second ultrasonic device, or a combination thereof to radiate the ultrasonic wave based on the information about the passenger in response to determining that there is the mosquito in the vehicle.

2. The mosquito repellent system of claim 1, wherein the information about the passenger comprises at least one of a seating position of the passenger, a sitting posture of the passenger, or the number of passengers, or any combination thereof.

3. The mosquito repellent system of claim 1, wherein the control device is configured to operate the first ultrasonic device, if an angle of a seat back of the vehicle is less than or equal to a predetermined first criterion and that a degree to which a seat position of the vehicle is adjusted in a longitudinal direction of the vehicle is less than or equal to a predetermined second criterion.

4. The mosquito repellent system of claim 1, wherein the control device is configured to operate the first ultrasonic device and operate some of ultrasonic vibrators of the second ultrasonic device if a passenger rides in only a first row seat of the vehicle.

5. The mosquito repellent system of claim 1, wherein the control device is configured to operate the first ultrasonic device and the second ultrasonic device if passengers ride in a first row seat and a second row seat of the vehicle.

6. The mosquito repellent system of claim 1, wherein the control device is configured to control the first ultrasonic device and the second ultrasonic device to radiate an ultrasonic wave to a door glass if passengers ride in a third row seat or more of the vehicle, and wherein a mosquito repellent sound field is formed as the ultrasonic wave multiply reflected from the door glass.

7. The mosquito repellent system of claim 1, wherein the control device is configured to:
   transmit a primary ultrasonic wave in response determining that there is the mosquito in the vehicle;
   determine a position of the mosquito in the vehicle;
   determine a first window based on the position of the mosquito;
   determine whether the position of the mosquito is within a predetermined threshold distance from the first window;
   open the first window in a state where the vehicle is stopped in response determining that the position of the mosquito is within the predetermined threshold distance from the first window; and
   control the at least one of the first ultrasonic device or the second ultrasonic device, or a combination thereof to radiate the ultrasonic wave at maximum power.

8. The mosquito repellent system of claim 7, wherein the control device is configured to transmit a secondary ultrasonic wave for guiding the mosquito to the first window in response determining that the position of the mosquito is not within the predetermined threshold distance from the first window.

9. The mosquito repellent system of claim 1, wherein the control device is configured to:
   select a window closest to a position of the mosquito in response determining that the vehicle is in a stop state;
   transmit the ultrasonic wave; and
   open the selected window.

10. The mosquito repellent system of claim 1, wherein the control device is configured to:
    operate the first ultrasonic device to radiate the ultrasonic wave to a first row seat in the vehicle in response determining that the vehicle is in a driving state;
    determine whether there is a passenger in an ultrasonic radiation area of the second ultrasonic device with regard to at least one of an ultrasonic radiation pattern, a passenger sitting posture, or a seat position, or any combination thereof;
    operate at least some of ultrasonic vibrators of the second ultrasonic device in response determining that there is the passenger sitting in the first row seat in the ultrasonic radiation area;
    operate all the ultrasonic vibrators of the second ultrasonic device in response determining that there is the passenger sitting in a second row seat in the vehicle in the ultrasonic radiation area; and
    turn off the second ultrasonic device if there is no passenger in the ultrasonic radiation area.

11. The mosquito repellent system of claim 1, wherein the passenger detection device is configured to detect the passenger using at least one of a sitting sensor or a camera, or any combination thereof.

12. The mosquito repellent system of claim 1, wherein the mosquito recognition device is configured to recognize the mosquito using at least one of a camera or an ultrasonic sensor, or any combination thereof.

13. The mosquito repellent system of claim 1, wherein the first ultrasonic device and the second ultrasonic device are inserted into at least one of a roof trim in the vehicle, a door trim in the vehicle, a seat in the vehicle, a trunk trim in the vehicle, or a tailgate trim in the vehicle, or any combination thereof.

14. A method for operating a mosquito repellent system, the method comprising:

obtaining information about a passenger in a vehicle using a passenger detection device included in the mosquito repellent system;

determining whether there is a mosquito in the vehicle using a mosquito recognition device included in the mosquito repellent system; and controlling at least one of a first ultrasonic device included in the mosquito repellent system or a second ultrasonic device included in the mosquito repellent system, or any combination thereof to radiate an ultrasonic wave based on the information about the passenger in response determining that there is the mosquito in the vehicle.

15. The method of claim 14, wherein the information about the passenger comprises at least one of a seating position of the passenger, a sitting posture of the passenger, or the number of passengers, or any combination thereof.

16. The method of claim 14, wherein the controlling of the at least one of the first ultrasonic device or the second ultrasonic device, or a combination thereof to radiate the ultrasonic wave comprises:

operating the first ultrasonic device if an angle of a seat back of the vehicle is less than or equal to a predetermined first criterion and if a degree to which a seat position of the vehicle is adjusted in a longitudinal direction of the vehicle is less than or equal to a predetermined second criterion.

17. The method of claim 14, wherein the controlling of the at least one of the first ultrasonic device or the second ultrasonic device, or a combination thereof to radiate the ultrasonic wave comprises:

operating the first ultrasonic device and operating some of ultrasonic vibrators of the second ultrasonic device if a passenger rides in only a first row seat of the vehicle.

18. The method of claim 14, wherein the controlling of the at least one of the first ultrasonic device or the second ultrasonic device, or a combination thereof to radiate the ultrasonic wave comprises:

operating the first ultrasonic device and the second ultrasonic device, when passengers ride in a first row seat and a second row seat of the vehicle.

19. The method of claim 14, wherein the controlling of the at least one of the first ultrasonic device or the second ultrasonic device, or a combination thereof to radiate the ultrasonic wave comprises:

controlling the first ultrasonic device and the second ultrasonic device to radiate the ultrasonic wave to a door glass if passengers ride in the third row seat or more of the vehicle, and wherein a mosquito repellent sound field is formed as the ultrasonic wave multiply reflected from the door glass.

20. The method of claim 14, wherein the controlling of the at least one of the first ultrasonic device or the second ultrasonic device, or a combination thereof to radiate the ultrasonic wave comprises:

transmitting a primary ultrasonic wave in response determining that there is the mosquito in the vehicle;

determining a position of the mosquito in the vehicle;

determining a first window based on the position of the mosquito;

determining whether the position of the mosquito is within a predetermined threshold distance from the first window;

opening the first window in a state where the vehicle is stopped in response determining that the position of the mosquito is within the predetermined threshold distance from the first window; and controlling the at least one of the first ultrasonic device or the second ultrasonic device, or a combination thereof to radiate the ultrasonic wave at maximum power; and/or wherein the controlling of the at least one of the first ultrasonic device or the second ultrasonic device, or a combination thereof to radiate the ultrasonic wave further comprises:

transmitting a secondary ultrasonic wave for guiding the mosquito to the first window in response determining that the position of the mosquito is not within the predetermined threshold distance from the first window; and/or wherein the controlling of the at least one of the first ultrasonic device or the second ultrasonic device, or a combination thereof to radiate the ultrasonic wave comprises:

selecting a window closest to a position of the mosquito in response determining that the vehicle is in a stop state; and transmitting the ultrasonic wave and opening the selected window; and/or wherein the controlling of the at least one of the first ultrasonic device or the second ultrasonic device, or a combination thereof to radiate the ultrasonic wave comprises:

operating the first ultrasonic device to radiate the ultrasonic wave to a first row seat in the vehicle in response determining that the vehicle is in a driving state;

determining whether there is a passenger in an ultrasonic radiation area of the second ultrasonic device with regard to at least one of an ultrasonic radiation pattern, a passenger sitting posture, or a seat position, or any combination thereof, operating at least some of ultrasonic vibrators of the second ultrasonic device in response determining that there is the passenger sitting in the first row seat in the ultrasonic radiation area;

operating all the ultrasonic vibrators of the second ultrasonic device in response determining that there is the passenger sitting in a second row seat in the vehicle in the ultrasonic radiation area; and turning off the second ultrasonic device, when there is no passenger in the ultrasonic radiation area.

* * * * *